United States Patent [19]

Parent et al.

[11] Patent Number: 5,246,683
[45] Date of Patent: Sep. 21, 1993

[54] PROCESS FOR PRODUCING SMALL PARTICLES OF ALUMINUM NITRIDE AND PARTICLES SO-PRODUCED

[75] Inventors: Luc Parent, Chicoutimi; Mukesh Jain, Jonquiere, both of Canada

[73] Assignee: Alcan Internatonal Limited, Montreal, Canada

[21] Appl. No.: 956,054

[22] Filed: Oct. 2, 1992

Related U.S. Application Data

[63] Continuation-in-part of Ser. No. 725,348, Jul. 3, 1991, abandoned.

[51] Int. Cl.$^5$ ............................................. C01B 21/072
[52] U.S. Cl. ........................................ 423/412; 501/96
[58] Field of Search .......................................... 423/412

[56] References Cited

U.S. PATENT DOCUMENTS

| | | | |
|---|---|---|---|
| 4,618,592 | 10/1986 | Kuramoto et al. | 423/412 |
| 5,049,367 | 9/1991 | Nakano et al. | 423/412 |
| 5,087,592 | 2/1992 | Nadkarni | 501/96 |
| 5,096,860 | 3/1992 | Nadkarni | 501/96 |
| 5,114,695 | 5/1992 | Jain et al. | 423/411 |
| 5,116,679 | 5/1992 | Nadkarni et al. | 428/367 |

FOREIGN PATENT DOCUMENTS

| | | |
|---|---|---|
| 0308116 | 3/1989 | European Pat. Off. . |
| 0353052 | 7/1989 | European Pat. Off. . |
| 0371771 | 6/1990 | European Pat. Off. . |
| 2-96709 | 12/1990 | Japan ................................... 423/412 |
| WO91/18845 | 12/1991 | World Int. Prop. O. . |
| WO91/19027 | 12/1991 | World Int. Prop. O. . |

Primary Examiner—Wayne Langel
Attorney, Agent, or Firm—Cooper & Dunham

[57] ABSTRACT

A process for producing small particles of aluminum nitride suitable for sintering and the particles thus-produced. The process comprises reacting particles of gamma alumina, or a precursor thereof, of less than 1 micron in size with a stoichiometrical excess of finely divided carbon in the presence of nitrogen, or a precursor which provides nitrogen in the reaction conditions, first at a temperature in the range of 1550° to 1700° C. for a period of between 1 and 6 (preferably 1 to 4) hours and then at a temperature in the range of 1750° to 1850° C. for a period of 1 to 4 (preferably 1 to 2) hours, followed by cooling said reaction mixture and reheating to a temperature in the range of 500° to 700° C. in an oxygen-containing atmosphere, and maintaining the temperature until excess unreacted carbon is removed. The alumina or precursor preferably has a particle size of less than 400 nm and the carbon source preferably contains iron as an impurity, and is preferably petroleum coke. The AlN product is particularly suited for use in forming a substrate for electronic components by a process involving sintering of the AlN particles because of the small size (less than 2 microns) and narrow size distribution of the particles.

15 Claims, 2 Drawing Sheets

PROCESS FOR PRODUCING SMALL PARTICLES OF ALUMINUM NITRIDE AND PARTICLES SO-PRODUCED

CROSS REFERENCE TO RELATED APPLICATION

This application is a continuation-in-part of applicants' copending application Ser. No. 725,348 filed Jul. 3, 1991, abandoned.

BACKGROUND OF THE INVENTION

I. Field of the Invention

This invention relates to a process for producing small particles of aluminum nitride. In particular, the invention produces a process capable of producing small particles of aluminum nitride suitable for producing a sintered product.

II. Description of the Prior Art

Aluminum nitride is attracting much interest nowadays for various commercial uses but particularly as a substrate for electronic components. It has been found that aluminum nitride has properties which make it particularly suitable for this purpose. In particular, pure or relatively pure aluminum nitride combines high thermal conductivity and low electrical conductivity. Accordingly, electronic substrates formed on an aluminum nitride substrate show less tendency to become overheated than components formed on other materials without any loss of reliability due to current leakage or the like.

Substrates for electronic components can be made out of aluminum nitride by sintering together suitable particles of this material. However, aluminum nitride powders currently used for such sintering procedures are not ideal because they are normally made up of particles having a wide distribution of sizes. For best performance, the powder should be made up of approximately submicron-sized particles having a relatively narrow size distribution, but conventional procedures for producing aluminum nitride do not normally produce powders of this kind and so additional grinding and classification steps are required if an ideal substrate is to be formed. These additional steps add cost and complexity to the manufacturing process.

Examples of known processes for producing aluminum nitride are briefly discussed below.

First of all, it is well known that aluminum nitride can be produced by the carbothermal reduction of alumina according to the following reaction:

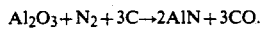

$Al_2O_3 + N_2 + 3C \rightarrow 2AlN + 3CO$.

This basic reaction operates at a temperature in the range of 1400° to 1800° C. and tends to produce large particles having a size in the range of 1 to 10 microns. Many modifications of this basic procedure are already known, and some examples are discussed below, but none of these known processes is capable of producing an aluminum nitride powder that is ideal for sintering purposes.

Published PCT Patent Application WO-91/00842 in the name of Charles et al published on Jan. 24, 1991 relates to a process for manufacturing aluminum nitrite in which a substantially homogenous mixture of carbon and aluminum trihydroxide or its dehydration product, gamma aluminum oxide, is reacted with nitrogen by heating to a temperature of not less than 1200° C. and preferably not more than 1600° C. The preferred temperature is between 1450° and 1550° C. The particle size of the starting material is stated to be in the range of 0.5 to 1.5 microns and desirably between 0.6 and 0.8 microns. The particle size of the aluminum nitride product is substantially the same as that of the starting material. It is stated that, if the particle size is too low, there is an increase in oxygen impurities and handling problems. The resulting particles are found to be not ideal for the preparation of substrates for electronic components.

U.S. Pat. No. 4,680,278 to Inoue et al issued on Jul. 4, 1987 discloses a process for preparing aluminum nitride powder by the carbothermal reduction process mentioned above. However, the reaction is carried out in the presence of at least one additive selected from aluminum nitride powder, silicon nitride powder, silicon carbide powder and powders of certain other substances. The process is stated to be useful for preparing aluminum nitride powder of small particle size and narrow size distribution. The alumina starting material is between 1 and 20 microns in size, preferably between 2 and 5 microns. The resulting particles are often impure because of the use of the additive and it is found that the resulting particles are not ideal.

U.S. Pat. No. 4,917,877 to Oguni et al issued on Apr. 17, 1990, discloses a process for producing aluminum nitride powder by the carbothermal reduction process in which a solid organic compound is added to the mixture. The resulting particles appear to have a size of about 1 micron. Again, however, the particles are not pure and are not ideal for the intended application.

British Published Patent Application 2,127,390A to Nobuyuki Kuramoto et al published on Apr. 11, 1984 relates to a process for producing a fine powder of aluminum nitride having an average particle diameter of not more than 2 microns. The process involves firstly wet mixing an aluminum powder of less than 2 microns in size with a carbon of less than 1 micron in size and, secondly, heating the mixture to a temperature in the range of 1400° to 1700° C. in a nitrogen atmosphere. Again, it is found that an ideal aluminum nitride powder is not formed.

OBJECTS OF THE INVENTION

Accordingly, an object of the present invention is to provide a process for producing an aluminum nitride powder of small particle size and narrow size distribution.

Another object of the invention is to provide such a process which results in the formation of relatively pure aluminum nitride.

Yet another object of the invention is to provide such a process which can be carried out relatively economically and preferably with few different process steps.

SUMMARY OF THE INVENTION

According to one aspect of the present invention there is provided a process for producing aluminum nitride powder made up of particles of less than about 2 microns in size having a narrow size distribution suitable for sintering, which process comprises reacting particles of gamma alumina, or a precursor thereof, of less than 1 micron in size with a stoichiometrical excess of finely divided carbon in the presence of nitrogen, or a precursor which provides nitrogen in the reaction conditions, first at a temperature in the range of 1550 to 1700° C. for a period of between 1 and 6 hours and then at a temperature in the range of 1750° to 1850° C. for a period of 1 to 4 hours, followed by cooling said reaction mixture, and reheating to a temperature in the range of 500° to 700° C., in an oxygen-containing atmosphere, and maintaining the temperature until excess unreacted carbon is removed.

According to another aspect of the invention there is provided an aluminum nitride powder produced by the above process, and a sintered product produced from the powder.

A particular advantage of the present invention is that it can be carried out in the absence of an additive, e.g. of the kind required in the prior art processes mentioned above.

DETAILED DESCRIPTION OF THE PREFERRED EMBODIMENTS

Figure 1:
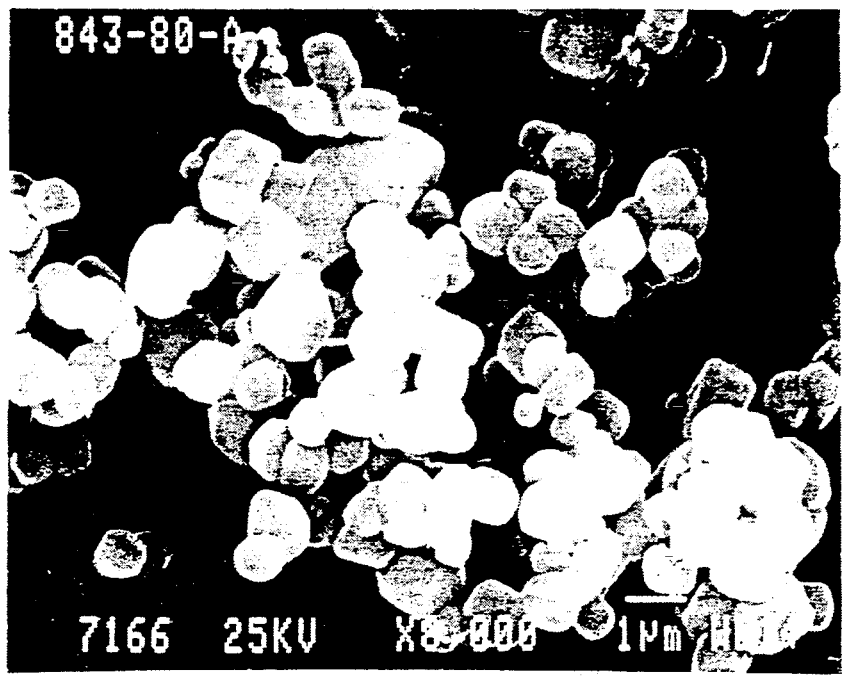
FIGS. 1 to 3 are photomicrographs of products produced according to the following Examples.

In the present invention, aluminum nitride is produced by the carbothermal reduction of alumina (carbonitridation) using special starting materials and reaction steps.

The alumina employed for the invention must be gamma alumina or a precursor which converts to finely divided gamma alumina upon heating, for example finely ground aluminum hydrate subjected to flash activation and the hydrolysis products of various aluminum organic compounds such as aluminum ethoxides, butoxides, etc., which yield finely divided aluminum hydroxides which in turn can be converted to gamma alumina by heat treatment. The particle size of the gamma alumina or precursor should be less than 1 micron and is preferably in the order of 10 to 400 nanometers, and more preferably 10 to 100 nanometers, the most preferably size range being 10 to 30 nanometers. While not wishing to be bound by any theory, it is believed that, the smaller the particle size of the gamma alumina or precursor, the smaller the particle size of the product will be. A particularly preferred gamma alumina starting material is the product sold by Degussa AG under the trade-mark AEROSIL ALUMINUM OXIDE C. This material has a BET surface area of 100±15 m$_2$/g, an average primary particle size of 20 nm, a gamma alumina structure and a composition as indicated in the following table:

| CONSTITUENT | PERCENT BY WEIGHT |
| --- | --- |
| Al$_2$O$_3$ | >99.6 |
| TiO$_2$ | <.1 |
| SiO$_2$ | <.1 |
| Fe$_2$O$_3$ | <.2 |
| HCl | <.5 |

The carbon used in the process of the present invention may be any form of finely divided carbon, but an impure form of carbon such as under-calcined petroleum coke is especially preferred. The particle size of the carbon should preferably be finely divided, e.g. less than 45 microns in particle size (diameter). Ideally, the carbon particles should be less than about 1 micron in size. Petroleum coke contains a number of impurities, the principal ones being as follows:

| Impurity | % by weight |
| --- | --- |
| Sulphur | 2 to 6 |
| Iron | 0.16 to 0.40 |
| Silicon | 0.1 to 0.40 |
| Total Ash | <0.1 to 1 |

Other sources of carbon containing similar impurities, particularly iron, are also preferred.

The reason why it is preferred to use an impure form of carbon such as coke dust rather than pure carbon is that a high degree of homogeneity with the alumina particles can thereby be obtained. It appears that impurities in the coke, particularly iron, increase the affinity of coke particles for the gamma alumina particles. Indeed, the affinity between the coke and alumina particles may be greater than the affinities of these particles for their own materials. This helps to break down agglomerates during the mixing step and makes it possible to obtain almost completely homogeneous mixtures. It is important in the present invention to obtain an homogeneous mixture because it has been found that this ensures that the product has a narrow particle size distribution.

The preferred method of mixing the alumina and carbon particles is dry mixing, because it is easier, faster and less expensive than other methods. It is necessary to use a stoichiometrical excess of carbon in the mixture. The alumina:carbon weight ratio should preferably be between 100:36 and 100:42 (ideally about 100:38).

The resulting dry mixture is then subjected to a heating procedure in the presence of nitrogen or a precursor which produces nitrogen in the reaction conditions, for example ammonia or an amine. The atmosphere in which the reaction is carried out should not contain an oxidizing material such as oxygen or air.

The reaction under the atmosphere of nitrogen or precursor is carried out in two stages in a reactor of any suitable kind, e.g. a graphite reactor. First of all, the mixed reactants are heated at a temperature in the range of 1550° to 1700° C. for a period of between 1 and 6 hours, preferably between 1 and 4 hours. The most preferred reaction temperature is about 1650° C. and the most preferred time is about 4 hours. During this period of time, most or all of the gamma alumina is converted to AlN. Secondly, the reactants are then heated at a higher temperature in the range of 1750° to 1850° C. for a period of 1 to 4 hours, more preferably 1 to 2 hours. The most preferred temperature is about 1850° C. and the most preferred time is about 1 hour. During this period, any unreacted gamma alumina is converted to AlN and certain impurities are evaporated from the reaction product. If the reaction is carried out for more than 4 hours, AlN crystals may start to form thus making the particles larger than desired. In this second step, the content of iron or iron compounds in the AlN originating from the carbon and/or gamma alumina is considerably reduced. This is particularly advantageous because iron compounds substantially decrease the thermal conductivity of the AlN.

The two step reaction of the present invention makes it possible to produce a desirable product without resorting to the use of additives or special techniques. The first reaction step produces the desired small particles of AlN and the second step purifies the particles without unduly increasing the particle size. Moreover, the first step decreases the oxygen content of the product (e.g.

to 0.7-0.9% by weight at 1650° C. for three hours) and then the second step decreases the oxygen content even further (e.g. to 0.3-0.5 by weight at 1850° C. for 1 hour).

Following these two heating steps under nitrogen, the product is allowed to cool to room temperature under the reaction atmosphere. It is then reheated in an oxygen-containing atmosphere until it achieves a temperature of about 500° to 700° C. Any remaining unreacted carbon in the product is converted in this step to CO or $CO_2$ and is thus removed from the product. This normally requires a period of time in the range of 1 to 2 hours, after which the product can be allowed to cool to ambient temperature.

The resulting product consists largely or substantially completely of unagglomerated particles of aluminum nitride of 0.5 to 2.0 microns in size, having an oxygen content below 1.5% (preferably below 1.0% and desirably below 0.5%) by weight and containing essentially no iron contaminants.

The reaction can be carried out on a batchwise or continuous basis by suitable standard techniques.

The resulting AlN powder can be sintered without difficulty to form an effective substrate for electronic compounds. The powder is first moulded to form a green part and the green part is then heated to sintering temperatures. The small and uniform particle size makes it possible to produce a green part of high density which is subsequently sintered with little contraction and cracking.

The invention is illustrated in further detail by reference to the following examples, which are not intended to be limiting.

EXAMPLE 1

100 parts by weight of gamma alumina from Degussa (AEROSIL ALUMINUM OXIDE GRADE C) were dry mixed with 38 parts by weight of −325 mesh undercalcined petroleum coke from Arvida coke calciners. After heating the mixture for 4 hours at 1650° C. and 1 hour at 1750° C. in nitrogen, followed by heating in air at 500°-700° C. for 1-2 hours, an AlN powder containing 0.46% by weight of oxygen was obtained. The product was composed of particles of about 1 micron (see FIG. 1) and the particles contained the following elements in the given proportions:

| ELEMENT | PERCENT BY WEIGHT |
|---------|-------------------|
| Ca | 0.0431 |
| Co | 0.0002 |
| Cr | 0.0003 |
| Cu | 0.0017 |
| Fe | 0.0344 |
| Mg | <0.0001 |
| Na | <0.0011 |
| Ni | 0.0011 |
| Si | 0.0007 |
| Ti | 0.0021 |

EXAMPLE 2

The procedure of Example 1 was repeated except that the particle size of the coke dust was reduced. The resulting product was found to contain an even lower amount of iron and particles of a smaller size. Full details of the example are given in the following.

Figure 2:
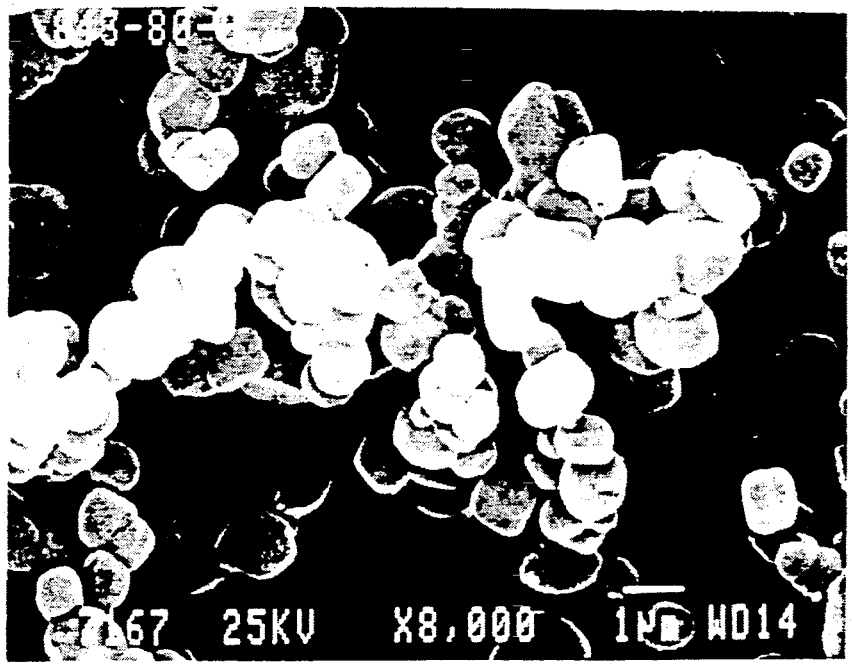

100 parts by weight of gamma alumina from Degussa (AEROSIL ALUMINUM OXIDE GRADE C) were dry mixed with 38 parts by weight of undercalcined petroleum coke from Arvida coke calciners. In this case, the coke consisted of dust made up of particles smaller than 3 microns in size. After heating the mixture for 4 hours at 1650° C. at 1 hour at 1750° C. in nitrogen, followed by heating in air at 500°-700° C. for 1-2 hours, an AlN powder containing 0.76% by weight of oxygen was obtained. The particles had a size of about 1 micron (see FIG. 2). The analysis of the particles is shown below.

| ELEMENT | PERCENT BY WEIGHT |
|---------|-------------------|
| Ca | 0.0166 |
| Co | 0.0002 |
| Cr | 0.0001 |
| Cu | 0.0005 |
| Fe | 0.00010 |
| Mg | <0.0001 |
| Na | <0.0011 |
| Ni | <0.0007 |
| Si | 0.0007 |
| Ti | 0.0012 |

EXAMPLE 3

Figure 3:
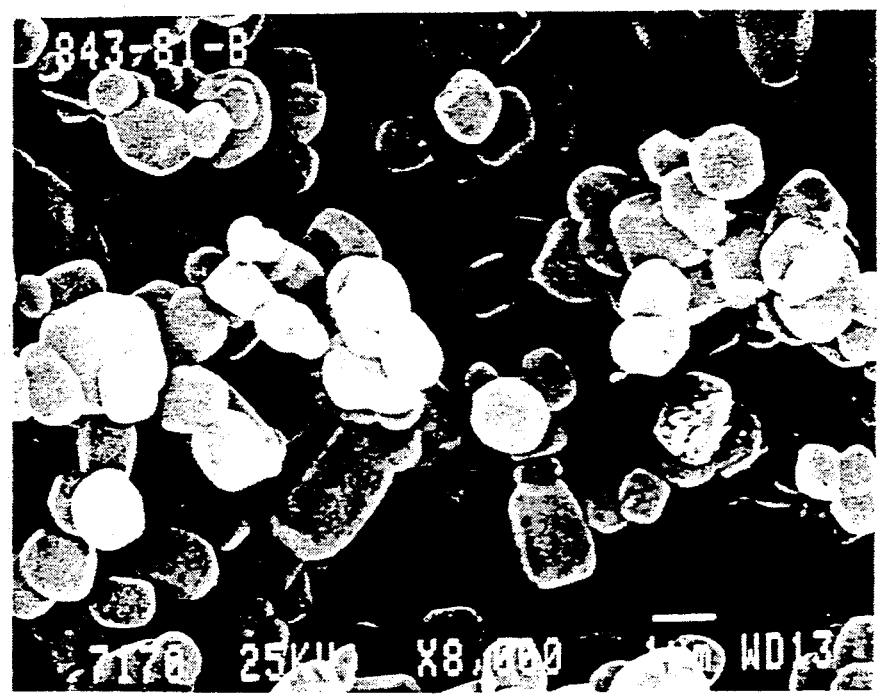

100 parts of gamma alumina from Degussa (AEROSIL ALUMINUM OXIDE GRADE C) were dry mixed with 38 parts by weight of undercalcined petroleum coke from Arvida coke calciners. The coke consisted of a dust made up of particles smaller than 3 microns in size. After heating the mixture for 3 hours at 1650° C. at 1 hour at 1850° C. in nitrogen, followed by heating in air at 500°-700° C. for 1-2 hours, an AlN powder containing 0.37% by weight of oxygen was obtained. The particles had a size of about 1 micron (see FIG. 3). The particles had the analysis given below, from which it will be seen that the amount of iron is very low.

| ELEMENT | PERCENT BY WEIGHT |
|---------|-------------------|
| Ca | 0.0096 |
| Co | 0.0002 |
| Cr | 0.0003 |
| Cu | 0.0018 |
| Fe | <0.0001 |
| Mg | <0.0001 |
| Na | <0.0011 |
| Ni | 0.0065 |
| Si | 0.0111 |
| Ti | 0.0014 |

What we claim is:

1. A process for producing aluminum nitride powder made up of unagglomerated particles of less than about 2 microns in size having a size distribution suitable for sintering, which process comprises mixing by a dry mixing procedure and then reacting particles of gamma alumina, or a precursor thereof, of less than 1 micron in size with a stoichiometrical excess of a finely divided impure form of carbon containing iron in the presence of nitrogen, or a precursor which provides nitrogen in the reaction conditions, first at a temperature in the range of 1550° to 1700° C. for a period of between 1 and 6 hours and then at a temperature in the range of 1750° to 1850° C. for a period of 1 to 4 hours, followed by cooling said reaction mixture, and reheating to a temperature in the range of 500° to 700° C. in an oxygen-containing atmosphere, and maintaining the temperature until excess unreacted carbon is removed.

2. A process according to claim 1 wherein said carbon contains the following impurities in the following amounts:

| Impurity | % by weight |
|---|---|
| Sulphur | 2 to 6 |
| Iron | 0.16 to 0.40 |
| Silicon | 0.1 to 0.40 |
| Total Ash | <0.1 to 1. |

3. A process according to claim 1 wherein said carbon is petroleum coke.

4. A process according to claim 1 wherein said carbon is in the form of particles having a size less than about 45 microns in diameter.

5. A process according to claim 1 wherein said carbon is in the form of particles having a size of less than about 1 micron in diameter.

6. A process according to claim 1 wherein said precursor of gamma alumina is selected from the group consisting of flash activated aluminum hydrate and hydrolysis products of aluminum organic compounds.

7. A process according to claim 1 wherein said alumina or precursor thereof is in the form of particles having a size of 10 to 400 nanometers.

8. A process according to claim 1 wherein said alumina or precursor thereof is in the form of particles having a size of 10 to 100 nanometers.

9. A process according to claim 1 wherein said alumina or precursor thereof is in the form of particles having a size of 10 to 30 nanometers.

10. A process according to claim 1 wherein said particles of alumina or precursor and said particles of carbon are mixed to substantial homogeneity prior to reacting said particles.

11. A process according to claim 1 wherein the weight ratio of alumina:carbon is 100:36-42.

12. A process according to claim 1 wherein the reaction is carried out at the first temperature for a period of 1 to 4 hours.

13. A process according to claim 1 wherein the reaction is carried out at said second temperature for a period of 1 to 2 hours.

14. A process according to claim 1 carried out in the absence of materials other than said alumina or precursor, said carbon and said nitrogen or precursor.

15. A process according to claim 1 wherein said reheating is carried out for a period of 1 to 2 hours.

* * * * *